United States Patent
Riek et al.

(10) Patent No.: US 11,953,888 B2
(45) Date of Patent: Apr. 9, 2024

(54) PRODUCTION CELL

(71) Applicant: Festo SE & Co. KG, Esslingen (DE)

(72) Inventors: Alfons Riek, Weilheim (DE); Curt-Michael Stoll, Esslingen (DE); Hans Klingel, Stuttgart (DE); Marcel Aeschlimann, Ligerz (CH); Samuel Malzach, Evilard (CH); Christian Schmid, Feusisberg (CH); Christoph Berger, Oberburg (CH); Judith Wimmer, Biel (CH); Ivo Aschwanden, Zürich (CH); Kilian Iannucci, Bern (CH); Alexandra Krause, Zürich (CH); Markus Andreas Müller, Zürich (CH); Martin Helmer, Zürich (CH); Peter Barmettler, Bern (CH)

(73) Assignee: Festo SE & Co. KG, Esslingen (DE)

( * ) Notice: Subject to any disclaimer, the term of this patent is extended or adjusted under 35 U.S.C. 154(b) by 656 days.

(21) Appl. No.: 16/759,621

(22) PCT Filed: Oct. 25, 2018

(86) PCT No.: PCT/EP2018/079326
§ 371 (c)(1),
(2) Date: Apr. 27, 2020

(87) PCT Pub. No.: WO2019/081663
PCT Pub. Date: May 2, 2019

(65) Prior Publication Data
US 2021/0370497 A1  Dec. 2, 2021

(30) Foreign Application Priority Data
Oct. 27, 2017  (EP) .................................. 17198995

(51) Int. Cl.
*G05B 19/418* (2006.01)
*B23P 21/00* (2006.01)
(Continued)

(52) U.S. Cl.
CPC ...... *G05B 19/41845* (2013.01); *B23P 21/004* (2013.01); *B25J 9/0096* (2013.01);
(Continued)

(58) Field of Classification Search
CPC ...... B25J 9/0096; B25J 9/1682; B25J 9/1697; G05B 19/41845; G05B 19/41815; G05B 19/40294; Y02P 90/02
See application file for complete search history.

(56) References Cited

U.S. PATENT DOCUMENTS 9,278,449 B1 * 3/2016 Linnell .................. B25J 9/1676
2003/0208903 A1  11/2003 Morbitzer et al.
(Continued)

FOREIGN PATENT DOCUMENTS

CN  105324219 A  2/2016

OTHER PUBLICATIONS

Chinese Office Action dated Aug. 5, 2023.

*Primary Examiner* — Spencer D Patton
(74) *Attorney, Agent, or Firm* — Hoffmann & Baron, LLP

(57) ABSTRACT

A production cell includes: at least one robot arranged to handle products; at least one buffer area for intermediate storage of products inside the production cell; a vision system with cameras arranged to determine, based on images from the cameras, the identity and the location of objects in the production cell a plurality of production modules, each production module comprising at least one Hardware Module configured to process products; and a plurality of module attachment locations, each module attachment location being configured to connect with an
(Continued)

interface section of a production module through at least a physical connection and a power connection.

7 Claims, 1 Drawing Sheet

(51) Int. Cl.
    *B25J 9/00*         (2006.01)
    *B25J 9/16*         (2006.01)
    *G05B 19/18*       (2006.01)

(52) U.S. Cl.
    CPC ........... *B25J 9/1682* (2013.01); *B25J 9/1697* (2013.01); *G05B 19/18* (2013.01); *G05B 19/41815* (2013.01)

(56) References Cited

U.S. PATENT DOCUMENTS

| | | | |
|---|---|---|---|
| 2006/0111813 A1* | 5/2006 | Nishiyama | G05B 19/41815 |
| | | | 700/253 |
| 2014/0379129 A1 | 12/2014 | Edsinger et al. | |
| 2020/0058081 A1* | 2/2020 | Saneyoshi | G06Q 10/20 |

\* cited by examiner

PRODUCTION CELL

This application claims priority based on an International Application filed under the Patent Cooperation Treaty, PCT/EP2018/079326, filed on Oct. 25, 2018, which claims priority to EP 17 198 995.7, filed on Oct. 27, 2017.

BACKGROUND OF THE INVENTION

The invention relates to the field of manufacturing automation. It relates to a production cell, a production module and a method for programming a production cell.

US 2006/111813 A1 discloses a manufacturing system with an industrial robot and a variety of unit frames that can be attached to or removed from a frame on which the robot is mounted.

US 2014/379129 A1 shows a modular reconfigurable workcell with quick connection of peripherals. A robot and interchangeable modules, which can carry different peripherals, can be mounted in a common base plate by means of modular docking bays.

US 2003/208903 A1 describes a manufacturing system having process modules for executing different process steps. The process modules have a substantially identical base structure which can be suited to the respective process steps.

Robotic manufacturing or production cells typically comprise one or more robotic manipulators, fixtures and/or machine tools. The manipulators are programmed to handle parts being produced, transferring them in an out of machine tools and fixtures, assembling them, holding them against a grinder or polishing machine, etc. Setting up and programming a production cell is a time-consuming process which must be performed for each different task that is to be performed by the production cell. During programming and testing the production cell cannot be used for production. Moreover generally, a production line is programmed to perform a specific process for its whole lifetime or for at least a couple of years, because it is difficult and time consuming to reconfigure the line to perform another action, since the tools are given. Only incremental improvements or changes are possible on the production line during its lifetime.

SUMMARY OF THE INVENTION

It is therefore an object of the invention to create a production cell, a production module and a method for programming a production cell of the type mentioned initially, which overcome the disadvantages mentioned above. In particular, possible objects of the invention are to
- provide a production cell which can easily be adapted to different tasks; and/or
- provide a method for programming a production cell by which the production cell can be adapted to different tasks with reduced downtime of the cell caused by programming the cell; and/or
- provide a production cell and/or a method for its programming that reduce its commissioning time.

These objects are achieved by a production cell, a production module and a method for programming a production cell according to the invention.

The production cell comprises:
- at least one robot or manipulator arranged to handle products;
- at least one buffer area for intermediate storage of products inside the production cell;
- a vision system arranged to determine the identity and/or the location of objects in the production cell;
- a plurality of production modules, each production module comprising at least one Hardware Module configured to process products;
- a plurality of module attachment locations, each module attachment location being configured to connect with an interface section of a production module through a power connection and optionally a physical connection, allowing the production cell to be reconfigured by interchanging production modules.

In other words, the production cell can be reconfigured by removing production modules and placing other production modules in the module attachment locations. This allows for a rapid and flexible adaptation of the production cell to different tasks. Both production cells and production modules can be standardised, leading to economies of scale and adaptability in deployment. For specific tasks, dedicated production modules can be created and integrated into standard production cells.

Furthermore, it becomes possible to adapt the production process to changing and additional requirements regarding quality, throughput or other parameters by exchanging production modules with production modules that have other properties regarding such parameters.

Also, it becomes possible to expand the capacity of a production cell by duplicating one or more production modules.

It further becomes possible to implement a gradual commissioning process, in which initially only a single production module or just a few are in operation, performing only part of a production process while the remaining part is performed by other means, e.g. manually. Production can begin with such an arrangement, and can be ramped up and automated more and more by developing and adding production modules for further parts of the production process. This is in contrast to arrangements where a complete production process needs to be set up, debugged and brought to full operating capacity in a single step. In embodiments, the presence of a production module, after it has been added to a production cell, is automatically detected, and/or its capabilities are determined and taken into account in planning future actions within the production cell, using the newly added production module.

It further becomes possible to reduce downtime by one or more of
- programming a production module offline, before incorporating it in the production cell;
- when maintenance or repair of a production module is to be performed, first preparing a functionally identical replacement production module and then exchanging it against the production module to be maintained;
- teaching and testing actions with one production module and copying the tested definitions of actions to other, functionally identical production modules.

Processing the products is understood to comprise one or more manufacturing steps for transforming the products, e.g. changing their shape, chemical properties, combination etc., typically by manipulating and moving the products, assembling, disassembling, machining, coating, chemical processing etc.

A "robot" is understood to comprise manipulators with grippers or other end effectors such as paint guns, machine tools, welding tools etc. Such a robot or manipulator can have one or more degrees of freedom of movement, typically three or more degrees of freedom. It can have an articulated arm, SCARA, spherical cartesian, parallel or other configuration. It can be driven by electrical, hydraulic and/or pneumatic drives. Depending on the context, a controller driving the robot or manipulator can also be considered to be part of the robot.

The vision system can be a 2D or 3D vision system. A 2D vision system can comprise cameras arranged to determine, based on images from the cameras, the identity and the location of objects in the production cell. It is understood to comprise, in addition to one or more cameras for acquiring digital still images or video streams, one or more data processing units for processing such images or streams and determining the identity and location of objects in the camera's field of view. This processing and determining can be done using single images or streams, or a combination from two or more cameras observing the same scene. The processing and determining can also use information from other sources, e.g. a priori knowledge or estimates of the identity and location of objects, or information from other sensors, such as RFID readers, ultrasound sensors, 3D-imaging devices, range finders etc. The vision system can use light or electromagnetic waves in the visible, UV, IR, microwave, terahertz range or at other wavelengths. A 3D vision system can comprise, alone or in combination with elements of a 2D vision system, one or more 3D range finders and/or 3D scanners and/or image data processors for determining depth from multiple images.

Here and in general, the term "location" of an object is understood to mean, depending on circumstances, either its approximate position in space, or its complete position and orientation, i.e. its 3D pose.

The objects being identified can be products processed in the production cell, and Hardware Modules that are part of the production cell.

In embodiments, one or more of the module attachment locations comprise a communication interface, configured to be connected with and communicate via a corresponding communication interface of the production module. The communication interfaces can use physical connectors or wireless communication links.

In embodiments, two or more of the module attachment locations are configured in the same manner and each of the production modules can be connected to any one of these two or more module attachment locations.

"Configured in the same manner" means that physical, power and communication interfaces are the same within a production cell. Since a plurality of the module attachment locations are present, and since at least a subset of this plurality is configured in the same way, a production module can be placed at and connected to any one of this subset. This allows, based on a definition of the interfaces (standard interface), to create production cells and production modules independently of each other. It further allows to adapt a production cell to any task at hand by installing appropriate production modules. If there are several production cells in one plant and/or in multiple plants at different locations, they can of course also be configured in the same manner.

Generally, power and/or communication interfaces can be implemented by cables or plugs installed in a floor, in walls, in a ceiling or in connection posts or pillars arranged in the production cell at each module attachment location.

In embodiments, the vision system is configured to identify and locate production modules. This—or other means for identifying and/or locating a production module inside the production cell—allows to place and connect a production module inside a production cell, after which the production cell, that is, a data processing system controlling the production cell, can automatically determine the identity and location of the production module, using the identity, retrieve, from a data repository, information describing the production module and software for controlling the production module. The means for identifying production modules can be the same as described above regarding determining the identity and location of objects in general. The information describing the production module can comprise a representation of actions that can be performed by the production module or in cooperation with the production module. This in turn can allow a planning system of the production cell to plan and execute such actions using the production module, or more generally, all the production modules that are present in the production cell.

The vision system can be configured to detect static as well as mobile objects and their location in space in order to prevent collisions. The objects can be elements of the production cell, such as production modules, tools, robots, machines, etc., and elements processed by the production cell, such as parts, products, sub-assemblies, etc. The vision system can be configured to determine properties of the objects, such as visual properties, physical dimensions, etc.

The data processing system controlling the production cell can be a single computer or a distributed system in which computing resources are distributed over more than one physical or virtual computer.

In embodiments, the production cell is configured to determine the identity and/or the location, in particular the 3D position and orientation, of Hardware Modules and products located inside the production cell and to generate, from these identities and the locations, a computer-based representation of the current state of the production cell.

Thus, since the Hardware Modules comprise the robots and components such as effectors and sensors of the robots and of the production modules, the current state of the production cell can be a complete representation of the internal state of the production cell, based on which the processing of the products within the production cell can be planned. As a result, after a loss of power, or after a production cell has been (re)configured by installing or exchanging Hardware Modules, the state of the production cell can be determined automatically.

The state of each Hardware Module and thus of the production cell can be used by the other Hardware Modules or production modules in the production cell to adapt their operation individually. This can be done, for example, by adapting a speed or cadence of operation.

In embodiments, the each Hardware Module, in particular each robot or manipulator and each production module, comprises a machine readable identification element that uniquely identifies the Hardware Module, and the production cell is configured to automatically determine, from the identification element, the identity of each Hardware Module located inside the production cell. The identity can be represented by an identifier such as a number or a string of characters.

The identification element can be an RFID tag and/or one or more optically readable tags placed on the Hardware Module. In embodiments, the identification element is a piece of information transmitted through a communication interface of the Hardware Module. That is, when the production cell and the Hardware Module (which can be a production module) communicate through a communication interface, the Hardware Module transmits its identity to the production cell. In other embodiments, the identification element is not a piece of information transmitted through a communication interface of the Hardware Module.

Given the identity of the Hardware Module as defined by the identification element, the production module, that is, an associated data processing system, can retrieve information describing the Hardware Module and software associated with the Hardware Module. Information about a status of a Hardware Module can be stored, for example in association with its identity. Such a status, together with actions performed by the Hardware Module can be retrieved in the case of failure and used to determine other Hardware Modules that can take over all or part of the tasks of the failed Hardware Module.

As a result, when a Hardware Module is added to the production cell, or when the production cell is physically reconfigured (by removing and adding Hardware Modules) and then turned on, or remaining operative, the production cell can determine, e.g., the identity of each Hardware Module from the identification element by means of the vision system or an RFID reader, and determine the location of each Hardware Module by means of the vision system. Determining the location can be done using the identification elements and/or on using a computer model of the Hardware Module to aid in locating it with the vision system. This computer model can be retrieved from storage based on the identification of the Hardware Module. The computer model can also be used for motion planning and collision avoidance.

In embodiments, further removable or exchangeable Hardware Modules, such as grippers, fixtures, tools, etc. all comprise such identification elements. In this way, such Hardware Modules can also be added to the production cell and automatically identified and located and represented in the computer-based representation of the current state.

In embodiments, each of the plurality of production modules is associated with a respective procedural component that defines actions that can be performed by the production module plugged in the production cell and by at least one robot or manipulator of the production cell.

The procedural component can be software or programs for controlling the production module and a robot, or, generally speaking, for controlling Hardware Modules. They can specify actions performed by such Hardware Modules and be stored in a data store or data repository. More about such stored representations of actions is described below in the context of programming a production cell.

The production module comprises:
a work area with at least one Hardware Module that is configured to interact with a product;
an interface section comprising
at least one power connector for providing power to the production module;
at least one communication interface; and
optionally comprising means for arranging the production module in a production cell.

In an embodiment, the means for arranging the production module in the production cell is at least one physical connector for mounting the production module in a production cell. The production module is in this manner configured to be connected to or plugged into a production cell by connecting the physical connector and the power connector to corresponding connectors of the production cell.

In an embodiment, the means for arranging the production module in the production cell is an arrangement of wheels for moving the production module into a production cell. The production module is in this manner configured to be connected to or plugged into a production cell by moving it at least approximately into a module attachment location, locking it into place by blocking the wheels, and connecting the power connector to corresponding connectors of the production cell.

The means for arranging the production module in the production cell can of course comprise both at least one such physical connector and such an arrangement of wheels.

The Hardware Module (that is part of the production module) is configured to interact with a product can be a fixture (or mounting element) for holding a product. The fixture can be configured to simply hold the part in place, or to move the part with one or two or more degrees of freedom. With the product held in the fixture, the robot or manipulator can hold and move a machine tool or other tool to work on or act on the product. Alternatively, the Hardware Module can be a machine tool or other tool, with the robot or manipulator holding and moving the product to be worked on or acted on by the tool.

The communication interface serves for providing information to the production module and/or for receiving information from the production module. The communication interface can use a wire-based or a wireless communication channel.

Typically, a plurality of production modules is provided, all with the same configuration of physical connectors and power connectors and optionally also wire-based communication interfaces.

In embodiments, the production module comprises a configurable interface, the configurable interface comprising
the interface section;
means to define a local I/O area of the production module;
an identity that identifies the production module.

In embodiments, the configurable interface comprises a connection to a data repository, wherein the data repository comprises information describing the production module and software for controlling the production module.

In embodiments, the production module is configured to receive commands controlling the operation of the production module through the configurable interface.

The means to define a local I/O area can be machine readable data that specifies one or more physical areas of the production module. This data can be read by the production cell. This data can be computer data specifying the area(s). This data can be markings painted on a surface of the production module. Based on this, the production cell can be operated to input and output products via the I/O area(s).

The identity can be specified by a machine readable identification element that is part of the interface.

The connection to the data repository can be a physical connection or a specification how to connect to the data repository. This can be a network address, an URL, etc.

The configurable interface can be a hardware element that can be added to a production module. Such an interface can be added to production modules of different types, allowing them to be interfaced to a production cell. When adding the interface, it can be configured by specifying the local. I/O area(s) and the identity, and optionally a configuration of the connection. Depending on the manner in which the I/O areas and identity are specified, this can be done by storing corresponding data in a data storage element of the configurable interface, or by adding visual markers or tags to the configurable interface or the production module. Configuration can be done by an operator.

In embodiments, the at least one Hardware Module is an actuator having an associated actuator controller, arranged to act on products. The products acted on are located in the work area and/or are being processed in the production module. For example, an actuator can be a motor arranged to move part of a fixture for holding a product.

In embodiments, the at least one Hardware Module is a fixture, in particular an active fixture. Correspondingly, interacting with a product comprises holding the product. An active fixture is a fixture that comprises an actuator arranged to move a component of the fixture.

In embodiments, the at least one Hardware Module is a sensor. Correspondingly, interacting with a product comprises measuring at least one physical property of the product located in the work area and/or being processed in the production module. The sensor can have an associated sensor controller for processing and transmitting sensor readings. The sensor can be used for object recognition, location, quality control, maintenance planning, etc.

In embodiments, the at least one Hardware Module is a tool, configured to act on a product. Correspondingly, interacting with a product comprises acting on the product. The tool can be a machine tool for shaping the product, e.g. by cutting, boring, grinding, polishing, shearing etc., or for treating or coating the product, e.g. by (spray)painting, heating, cooling, welding, etc.

In embodiments, the production module comprises a local I/O area for inputting products that are to be processed in the production module and for outputting products after processing in the production module. Such a local I/O area can be used as a local buffer for temporarily storing products before or after they are processed in the production module.

In embodiments, the local I/O area comprises product holding elements. These can be containers, in which the products are kept from sliding or rolling away, but are otherwise not constrained with regard to their position. Alternatively, the holding elements can be carrier elements that are adapted to the shape of the products, and thereby constrain a product placed in the holding element with regard to its position.

In embodiments, the local I/O area is a single area. In this case, the production module and/or the production cell are configured to use this single area for both inputting and for outputting products into/out of the production module.

In embodiments, the local I/O area comprises sub-areas, with at least one local input area and one local output area. In this case, the production module and/or the production cell are configured to use the local input area for inputting and the local output area for outputting products into/out of the production module, respectively.

This can be used for controlling operation of the production cell, in that the production modules can be operated to work autonomously, without being synchronised with the operation of other production modules. Whenever a product is output by a production module, the production cell can adapt its planning to further process this product. This can mean moving this product to another production module or to the cell I/O area. Such an opportunistic planning by the production cell allows to mix manual processing of products with processing by the production modules.

In embodiments, the production module comprises a local processor arranged to control the at least one Hardware Module—typically, one or more actuators and/or sensors—of the production module and to communicate via the communication interface. As already mentioned, the communication interface can be part of a configurable interface.

In embodiments, the production module is configured to transmit at least one of an identity and a status of the production module via the communication interface. This allows to communicate such information to other data processing units of the production cell and to plan and to coordinate actions that are performed by a plurality of production modules in the production cell.

The information can be used by other production modules for planning their own operation autonomously. This can be similar to the way in which human workers can adapt their planning and their actions to the status of workers or production modules with which they co-operate.

Information transmitted via the communication interface can comprise other data than the identity and status mentioned above. For example, information can be exchanged for distributing data processing and/or data storage tasks over data processing units of multiple production modules and other entities. Thereby, a distributed computing system can be implemented, sharing processing and storage loads over multiple data processing units.

The method for programming a production cell comprises the steps of e providing a production module;
  connecting the production module to an offline programming environment;
  providing at least one robotic manipulator or robot;
  accepting user input that defines actions by Hardware Modules of the production module and the at least one robot or manipulator;
  performing, in the offline programming environment, these actions by these Hardware Modules acting on products;
  storing a representation of these actions as stored actions in a data store;
  connecting the production module or a functionally identical production module to a production cell;
  retrieving the stored actions from the data store;
  performing, in the production cell, by the production module connected to the production cell and by at least one robot or manipulator of the production cell, the stored actions.

In this way it becomes possible to iteratively program and test the actions to be performed by the production module or, by the robot or manipulator in interaction with the production module. When the programming is finished, the production module can be moved into a production cell and be used productively, interacting with another robot.

The steps of accepting user input that defines actions and performing these actions are typically repeated iteratively until the actions are executed in a satisfactory manner. The manner of user input depends on the type of robot programming that is used. It can range from the teaching of paths to the specification of high level or task level commands that are automatically transformed into motion commands, e.g., by known task planning and motion planning methods.

Likewise, the manner in which the programmed actions are stored can be on the level of motion commands or motion trajectories, or high level or task level commands, or on an intermediate level.

In embodiments, the following steps are performed:
  when storing the stored actions, storing them in association with an identity that identifies the production module;
  in order to retrieve the stored actions,
    reading a machine readable identification element that uniquely identifies the production module located in the production cell;
    automatically determining, from the identification element, an identity of the production module located inside the production cell; and
    automatically retrieving, from the data store, the stored actions that are associated with the identity of the production module.

The identity of the production module located inside the production cell can be a unique identity, that is, there is only one production module that has this identity. Alternatively, this identity can be a class identity, that is, there are two or more production modules that have this class identity. In this case, these two or more production modules are functionally identical, that is, performing the stored actions on them gives the same result.

Further embodiments are evident from the dependent patent claims.

BRIEF DESCRIPTION OF THE DRAWINGS

The subject matter of the invention will be explained in more detail in the following text with reference to exemplary embodiments which are illustrated in the attached drawings, which schematically show.

In principle, identical parts are provided with the same reference symbols in the figures.

DETAILED DESCRIPTION

Figure 1:
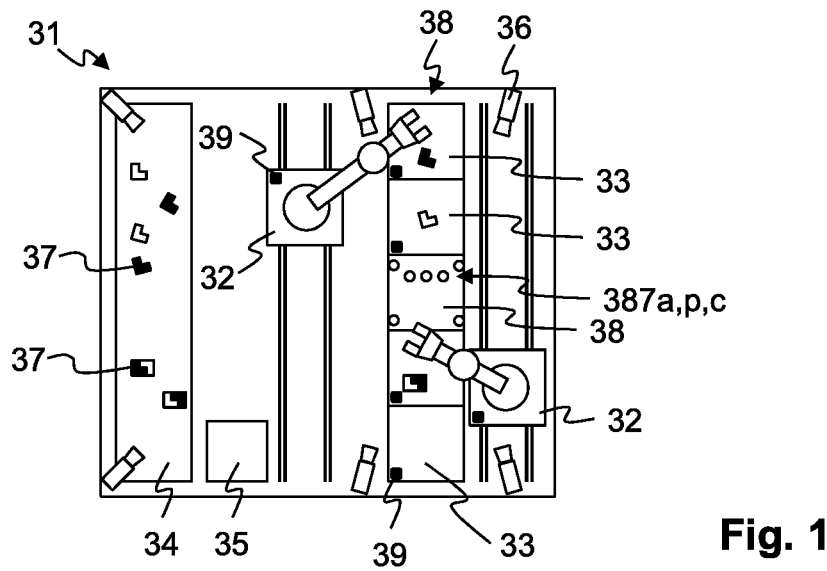
FIG. 1 a production cell.

FIG. 1 shows a universal production cell 31, with several production modules 33 at which and with which production steps can be performed, such as machining, assembling, testing, etc. Such production modules 33 will be explained in more detail below.

The production steps transform input products such as raw materials, blanks, semi-finished products, subassemblies etc. into output products, which can be finished products but also intermediate or semi-finished products that are then further processed outside the production cell 31. Input products, output products and intermediate products handled and processed in the production cell 31 shall simply be called products 37.

The production cell 31 further comprises a buffer area 34 for temporarily storing products 37, and one or more cell I/O areas 35 at which products 37 can be input to and/or outputted from the production cell 31. One or more manipulators or robots 32 are configured to handle products 37, that is, on the one hand, to move them between the cell I/O area 35, the buffer area 34 and the production modules 33. On the other hand, they are configured to assist in operations performed at the production modules 33, e.g. by assembling products 37, rearranging products 37 for machining at the production modules 33, moving products 37 and tools of a production module 33 relative to each other, for example, in deburring, welding, painting operations etc. The robots 32 can be movable on rails.

The production cell 31 comprises a plurality of module attachment locations 38, each module attachment location 38 being configured to accommodate a production module 33. Each module attachment location 38 comprises physical connectors 387a, power connectors 387p and communication interfaces 387c to which corresponding connectors of the production modules 33 can be connected. The module attachment locations 38, or at least two or more of the module attachment locations 38, are identical to each other such that a production module 33 can be connected to any of these identical module attachment locations 38. In the example shown in FIG. 1, five module attachment locations 38 are arranged in a row, in four of them a production module 33 is connected whereas the middle module attachment location 38 is empty. All production modules 33 have the same size (seen from above), and have the same set of connectors, and so do the corresponding module attachment locations 38. In other examples, not shown, there can be one or more module attachment locations 38 and corresponding interchangeable production modules 33 of a first type, and one or more module attachment locations 38 and corresponding interchangeable production modules 33 of a second type.

The robots 32 and components such as effectors and sensors of the robots 32 and the production modules 33 shall be called Hardware Modules 3. Hardware Modules 3 can be combined and configured to work as actuators and sensors. Hardware Modules 3 can be physically connected to form manipulators such as robot arms. Or Hardware Modules 3 can be complete (non-modular) manipulators or other devices such as numerically controlled machines, and sensors returning digital (on/off) values or analogue values, including cameras with or without image processing capabilities. Such Hardware Modules 3 can be arranged to cooperate with each other in handling real world objects.

A vision system comprises cameras 36 arranged to observe at least working areas of the production modules 33, the buffer area 34 and the cell I/O area 35, and preferably also the robots 32. A vision processing system is configured to determine, based on images from the cameras 36, the identity and the location (that is, position and orientation) of objects such as products 37, production modules 33 and Hardware Modules 3 in the production cell 31. The production modules 33 can be identified by machine readable identification elements 39. Processing for the vision processing system can be performed at a local processor and/or in remote or distributed processing units.

In order for the vision system to be able to identify the objects such as products 37, production modules 33 and Hardware Modules 3, such objects can comprise machine-readable tags, in particular optical tags such as barcodes, including 2D-barcodes. RFID tags can be used in combination with spatially directed reading of RFID codes or by bringing an RFID reader into close proximity of an object to be identified, e.g. by moving the reader or the object with a robot 32.

Figure 2:
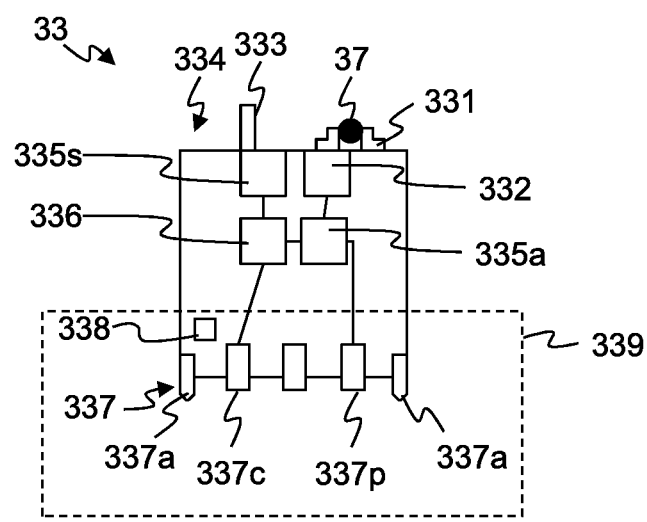
FIG. 2 a production module.

FIG. 2 shows a production module 33, comprising a local I/O area 334 and a work area for e.g. machining, assembling, testing etc. products 37, the work area comprising Hardware Modules 3 such as fixtures 331 and/or sensors 333. An interface section 337 comprises physical connectors 337a, power connectors 337p and a communication interface 337c, which can use physical connectors or wireless communication links. Further connectors can provide, e.g. pressurized air, coolant, water, drainage etc. The arrangement of the connectors is standardised in order to allow a production module 33 to be attached at any location within any production module 33 that follows the same standard and comprises a corresponding module attachment location 38.

One or more of the connectors can be present. Together with an interface definition, 338 they form a configurable interface 339. The interface definition 338 comprises means to define a local I/O area of the production module 33, and an identity that identifies the production module. These elements of the configurable interface can be distributed over the production module 33, or they can be embodied by a dedicated interface hardware.

The fixture 331 can have movable elements driven by an actuator 332 having an actuator controller 335a. The sensor 333 has an associated sensor controller 335s. The controllers 335 communicate with a local processor 336 of the production module 33 which can communicate with the production module 33 through the communication interface.

In other embodiments, in place of or in addition to the fixture 331 there can be cutting tools such as a milling machine or a lathe, grinders, welding machines etc. The sensor 333 can be e.g. configured to measure physical or chemical properties of products 37 or of product features, such as dimensions, weight, optical properties etc.

Figure 3:
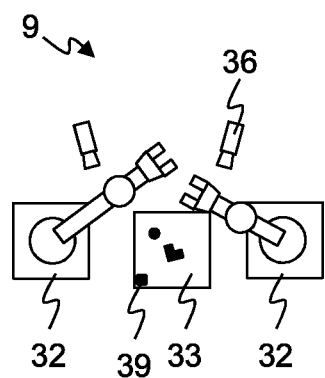
FIG. 3 an offline programming environment.

FIG. 3 shows an offline programming environment 9, comprising a production module 33, one or more robots 32 and cameras 36 with an associated vision system. This environment thus duplicates a subset of the features of a production cell 31. Within the offline programming environment 9, a process definition that specifies a number of actions that accomplish a particular task can be created and iteratively refined, using the real production module 33 and prototype products 37.

Once the process definition 82 has been brought to a satisfactory level of quality and reliability, the production module 33 can be installed in a production cell 31, and the process definition or the corresponding stored actions can be made available for execution in that production cell 31.

The invention claimed is:

1. A production cell comprising:
   at least one robot or manipulator arranged to handle products;
   at least one buffer area for intermediate storage of products inside the production cell;
   a vision system arranged to determine the identity and/or the location of objects in the production cell;
   a plurality of production modules, each production module comprising at least one Hardware Module configured to process products, wherein each of the plurality of production modules is associated with a respective procedural component that defines actions that can be performed by the production module plugged in the production cell and by the at least one robot or manipulator of the production cell; and
   a plurality of module attachment locations, each module attachment location being configured to connect with an interface section of a production module through a power connection and optionally a physical connection, allowing the production cell to be reconfigured by interchanging production modules,
   wherein a data processing system controlling the production cell determines the identity and location of the production modules and generates from these identities and the locations a computer-based representation of the current state of the production cell, and
   wherein the data processing system retrieves information describing the Hardware Module and software associated with the Hardware Module, and
   wherein the data processing system stores information about a status of the Hardware Module in association with an identity of the Hardware Module, wherein the respective procedural components are stored by the data processing system, and wherein the status and the respective procedural component, together with actions performed by the Hardware Module, are retrieved in the case of failure and used to determine other Hardware Modules that can take over all or part of the tasks of the failed Hardware Module.

2. The production cell according to claim 1, wherein two or more of the module attachment locations are configured in the same manner and each of the production modules can be connected to any one of these two or more module attachment locations.

3. The production cell according to claim 1, wherein the vision system is configured to identify and locate production modules.

4. The production cell according to claim 1, wherein each Hardware Module, each robot or manipulator and each production module, comprises a machine readable identification element that uniquely identifies the Hardware Module, and the production cell is configured to automatically determine, from the identification element, the identity of each Hardware Module located inside the production cell.

5. A method for programming a production cell, comprising the steps of
   providing a production module, the production module comprising: a work area with at least one Hardware Module that is configured to interact with a product; and an interface section, the interface comprising: at least one power connector for providing power to the production module; and at least one communication interface, wherein the production module is configured to be connected to a production cell by connecting the power connector to corresponding connectors of the production cell, wherein the production module is associated with a respective procedural component that defines actions that can be performed by the production module plugged in the production cell and by at least one robot or manipulator of the production cell;
   connecting the production module to an offline programming environment, wherein the offline programming environment duplicates a subset of the features of the production cell;
   providing the at least one robot or manipulator;
   accepting user input that defines actions by Hardware Modules of the production module and the at least one robot or manipulator;
   performing, in the offline programming environment, these actions by these Hardware Modules acting on products;
   storing a representation of these actions as stored actions in a data store;
   connecting the production module or a functionally identical production module into a production cell;
   retrieving the stored actions from the data store; and
   performing, in the production cell, by the production module connected to the production cell and by the at least one robot or manipulator of the production cell, the stored actions,
   wherein information about a status of the Hardware Module is stored in association with an identity of the Hardware Module in the data store, wherein the respective procedural components are stored in the data store, and wherein the status and the respective procedural components, together with the actions performed by the Hardware Module are retrieved in the case of failure and used to determine other Hardware Modules that can take over all or part of the tasks of the failed Hardware Module.

6. The method according to claim 5, further comprising the steps of:
   when storing the stored actions, storing them in association with an identity that identifies the production module; and
   in order to retrieve the stored actions:
      reading a machine readable identification element that uniquely identifies the production module located in the production cell;

automatically determining, from the identification element, an identity of the production module located inside the production cell; and automatically retrieving, from the data store, the stored actions that are associated with the identity of the production module.

7. A method for operating a production cell the method comprising the steps of:

providing a production cell, the production cell comprising: at least one robot or manipulator arranged to handle products; at least one buffer area for intermediate storage of products inside the production cell; a vision system arranged to determine the identity and/or the location of production modules or Hardware Modules in the production cell; a plurality of production modules, each production module comprising at least one Hardware Module configured to process products; and a plurality of module attachment locations, each module attachment location being configured to connect with an interface section of a production module through a power connection and optionally a physical connection, allowing the production cell to be reconfigured by interchanging production modules;

providing one or more production module, the production module comprising: a work area with at least one Hardware Module that is configured to interact with a product; and an interface section, the interface comprising: at least one power connector for providing power to the production module; and at least one communication interface, wherein each production module is associated with a respective procedural component that defines actions that can be performed by the production module plugged in the production cell and by the at least one robot or manipulator of the production cell, wherein the production module is configured to be connected to a production cell by connecting the power connector to corresponding connectors of the production cell and operating the production cell with the production modules;

and at least one of the steps of replacing one or more of the production module with replacement production modules that perform the same tasks as the production modules that they replace, but with different parameters;

adding one or more additional production modules that perform the same task as a production module that is already present in the production cell, thereby increasing production capacity of the production cell;

adding one or more new production modules that perform a task that is not yet performed in the production cell, thereby increasing a degree of automation of the production cell, wherein information about a status of the Hardware Module is stored in association with an identity of the Hardware Module, wherein the respective procedural components is stored in association with the identity of the Hardware Module and wherein the status and the respective procedural components, together with actions performed by the Hardware Module are retrieved in the case of failure and used to determine other Hardware Modules that can take over all or part of the tasks of the failed Hardware Module.

* * * * *